June 9, 1931.  L. M. BETTINGER  1,809,230
FIRE AND BLOW-OUT CONTROL
Filed Jan. 21, 1929  2 Sheets-Sheet 1
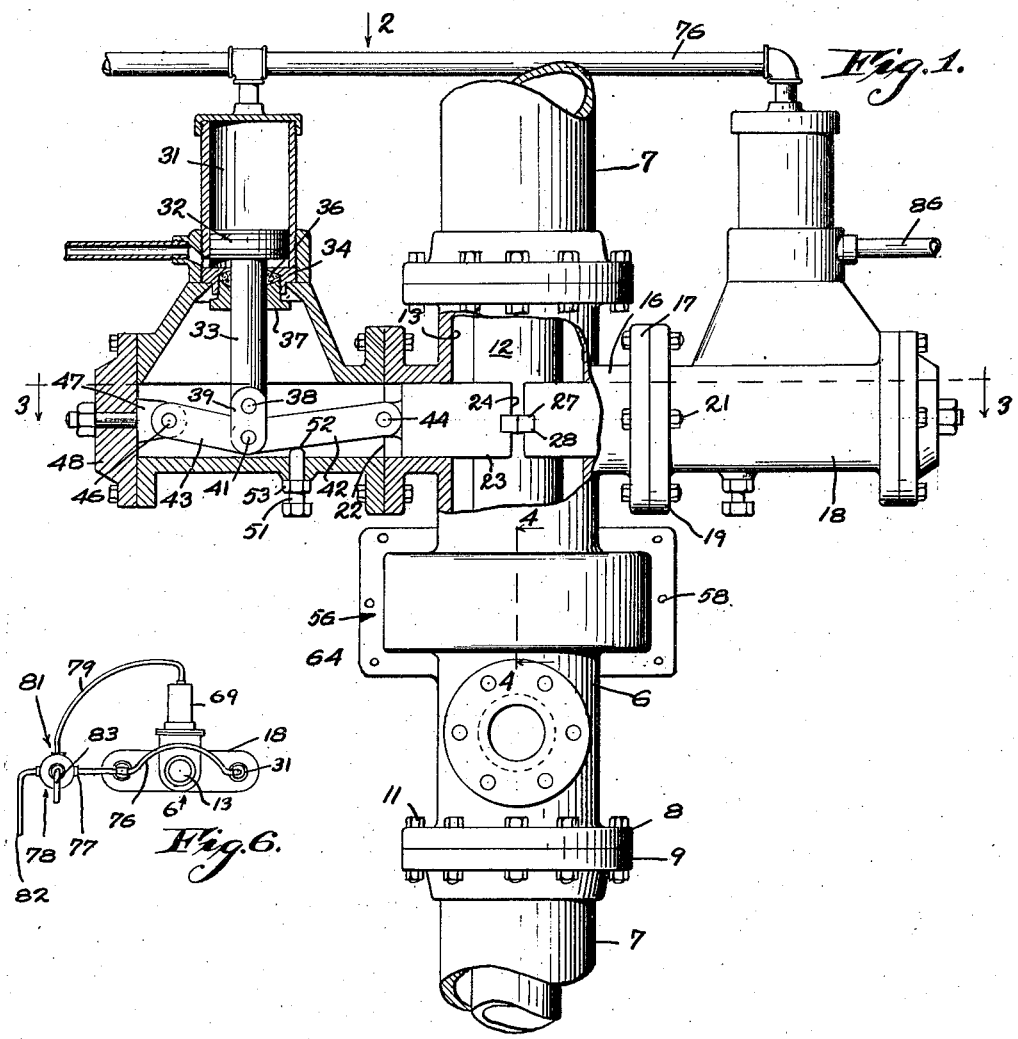
Fig. 1.
Fig. 6.
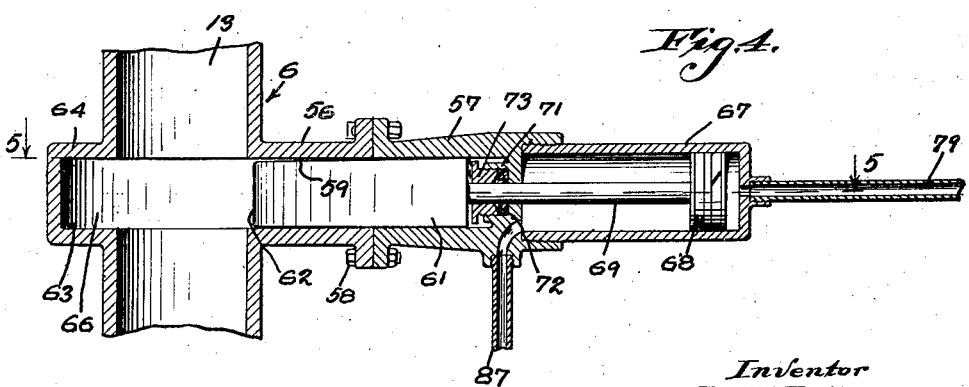
Fig. 4.
Inventor
L. M. Bettinger
by Hazard and Miller
Attorneys June 9, 1931.  L. M. BETTINGER  1,809,230
FIRE AND BLOW-OUT CONTROL
Filed Jan. 21, 1929  2 Sheets-Sheet 2

Patented June 9, 1931

1,809,230

UNITED STATES PATENT OFFICE

LOUIS M. BETTINGER, OF DOWNEY, CALIFORNIA, ASSIGNOR OF ONE-FOURTH TO RUTLAND H. BAKER, OF DOWNEY, CALIFORNIA

FIRE AND BLOW-OUT CONTROL

Application filed January 21, 1929. Serial No. 335,629.

This invention relates to deep well apparatus, and has for an object the provision of a practical device which may be applied to a well casing, preferably adjacent the upper end thereof, and which, in the event of an impending blow-out, will form a closure between the well casing and the drill pipe, to prevent the escape of gas or oil.

It frequently occurs during the process of drilling an oil or gas well, that when the drill penetrates a subterranean chamber wherein gas or oil, or both, under very high pressure, is contained, this pressure will force the drilling tools from the well. This is termed a "blow-out" and is apt to cause considerable damage to both life and property. It frequently happens that the pressure is so great that not only are the drilling tools carried from the well, but also the casing itself, motion of the casing starting after the contents of the casing have attained considerable velocity. Furthermore, the entire contents of the casing such as oil and gas, sand, and circulation fluid, will be driven from the well with such velocity that they will destroy the drilling rig and adjacent buildings and machinery. There is also imminent danger of fire and loss of life on such occasions.

An object of my invention therefore, is the provision of apparatus for preventing such blow-outs.

A further object is the provision of a blow-out preventer equally effective, regardless of whether a drill rod is disposed within the casing or not, at the time of the blow-out.

A more detailed object is the provision of a tubular housing adapted to be interposed in the well casing, preferably adjacent the upper end thereof, above the ground surface, and having gates slidable therein to effect sealing the upper end of the casing to prevent flow of fluids therethrough in the event of an impending blow-out.

A still further object is the provision of a blow-out preventing device as described, which is capable of being easily and quickly operated through the expedient of a single valve so that in the case of an emergency, one man may bring the apparatus into play to prevent what otherwise might develop into serious life and property loss.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a side elevation of the apparatus of the present invention, mounted in operative position within a well casing. Parts are broken away to reduce the length of the figure, and to better disclose the nature of the operating mechanism.

Fig. 2 is a top plan view of the device, with the casing and drill stem shown in horizontal section. The direction of view is indicated by the arrow 2 of Fig. 1.

Fig. 3 is a horizontal sectional view taken upon the line 3—3 of Fig. 1, with the direction of view as indicated.

Fig. 4 is a vertical sectional view taken upon the line 4—4 of Fig. 1, with the direction of view as indicated.

Fig. 5 is a compound, horizontal sectional view taken upon the lines 5—5 of Fig. 4, with the direction of view as indicated.

Fig. 6 is a diagrammatic view showing the conduits and control valve for selectively operating the device.

Specifically describing the invention in its most practical embodiment of which I am at present aware, I have provided a tubular housing 6 adapted to be interposed within a well casing 7, preferably adjacent the upper end thereof and above the ground level. However, in view of the fact that the apparatus may be controlled from a remote point, the positioning of the housing 6 within the casing 7, is immaterial. Flanges 8 are formed at the ends of the housing 6, and are adapted to be fastened to flanges 9 with which the casing 7 is provided. Bolts 11 or equivalent fastening means are employed to securely clamp the housing 6 in position. Hence, the housing 6 serves as a continuation of the casing 7, and is adapted to have the drill stem 12, or in fact, a pump rod, extend through the bore 13 thereof, so that the housing 6 in no way interferes with either the drilling or pumping operation.

A head 16 having a flange 17, extends laterally from each of two opposite sides of the housing 6; and to each of the flanges 17, a casting 18 is adapted to be rigidly attached, for which purpose each casting 18 is provided with a flange 19, so that bolts 21 or other fastening devices may tighten the flange 19 upon the flange 17.

Each of the castings 18, in connection with the associated head 16, forms a chamber 22 within which a gate 23 is slidable. The inner edge 24 of each of the gates, is provided with a semi-circular recess 26 conforming to the drill stem 12. The inner edge 24 of each of the gates, is also provided with a groove 27 extending thereacross for the reception of packing 28.

Means for sliding each of the gates 23 inwards to effect sealing the casing 7 and prevent the flow of fluids through the bore 13 thereof, are provided. A cylinder 31 is mounted upon each of the castings 18, and has a piston 32 reciprocably mounted therein. The rod 33 of each of the pistons 32, extends through a suitable stuffing-box 34 within which a packing 36 is retained by a gland nut 37. A pin 38 is provided adjacent the lower end of each of the rods 33, and preferably a pair of links 39 are pivoted upon each of the pins 38. Each pair of links 39 is also pivoted upon a pin 41; and this pin 41 also serves to pivotally join a pair of links 42 and 43. Each of the links 42 is pivoted as by a pin 44 to the associated gate 23, whereas each of the links 43 is pivoted as by a pin 46 to a boss 47 carried by a head 48 rigid with the outer end of the associated casting 18. Preferably the pins 44 and 46 occupy a plane disposed in parallelism with the direction of sliding of the gate 23. A bolt 51 is threaded through the bottom of each of the castings 18, so that its inner end 52 may engage the adjacent link 42 and limit downward movement thereof. A lock nut 53 may be tightened to hold the bolt 51 in adjusted position.

Another head 56 extends laterally from the housing 6, spaced from the heads 16. This head 56 also has a casting 57 rigidly attached thereto as by bolts 58, to provide a laterally extending chamber 59 within which another gate 61 is slidable. However, instead of being provided with a recess in its inner edge 62, the inner edge 62 of the gate 61, is shaped to conform to the opposite side 63 of the housing 6, which is preferably enlarged as at 64, to provide a socket 66 to receive the inner edge 62 of the gate 61. The casting 57 also is provided with a cylinder 67 within which a piston 68 is slidable; and the rod 69 of the piston 68, also extends through a stuffing-box 71 within which a packing 72 is retained by a gland nut 73. However, the rod 69 is disposed in parallelism with the direction of movement of the gate 61, instead of being disposed in perpendicularity therewith as are the rods 33. Consequently, the rod 69 is connected directly to the gate 61.

A conduit 76 in communication with both the cylinders 31, leads to one outlet port 77 of a three-way valve 78. Another conduit 79 leads from the cylinder 67 to the other outlet port 81 of the valve 78. An inlet conduit 82 is adapted to supply fluid under pressure such as steam, to the valve 78. The handle 83 of the valve 78 may be turned to selectively supply fluid under pressure optionally to the conduit 76 or the conduit 79. Conduits 86 and 87, lead from the cylinders 31 and 67 respectively, being connected to the cylinders at the ends thereof, opposite that end with which the conduits 76 and 79 respectively, communicate with the cylinders. These conduits 86 and 87 serve as drains, so that the pistons 32 and 68 respectively, may be moved freely and also permit the injection of fluid under pressure, to the under sides of the pistons so as to withdraw the associated gates 23 and 61 respectively, from sealing position.

The method of operation of the apparatus of the present invention is substantially as follows:

When indications are given that the well is about to "come in" the handle 83 of the valve 78 should be turned to direct fluid under pressure either to the conduit 76 or to the conduit 79. If it happens that there is no drill stem 12 or other member disposed within the casing 7, the fluid should be directed to the conduit 79, whereupon the piston 68 will drive the gate 61 into the socket 66 and prevent flow of fluids through the casing 7, and thus effectively prevent a blow-out. However, should it happen that the blow-out starts to occur during the drilling operation and when the drill stem 12 or similar rod-like structure is disposed within the casing 7 and through the housing 6, the valve 78 should be operated to direct fluid under pressure into the conduit 76, whereupon both pistons 32 will be driven downwards, it being understood that the gates 23 are normally in withdrawn position with the links 42 and 43 extending upwards in angularity with each other. This downward movement of the pistons 32 will cause the links 42 and 43 to straighten out, increasing their effective length and driving the gates 23 securely against the drill stem 12 and establishing a tight seal between the stem and the housing 6. It will be found that the leverage developed by the links 42 and 43, will be sufficiently great to press the gates 23 firmly against the drill stem 12 to hold the drill stem against being forced upwards by the pressure therebelow. However, if the drill stem does have a tendency to slip, such slippage will be positively stopped when one of the sleeves, by means of which the sections of the drill stem 12 are united, comes into contact with the under sides of the gates 23.

The stop bolts 51 should be so adjusted that the respective links 42 will come into engagement therewith when the pistons 32 have driven the pins 41 just past the plane including the axes of the pins 44 and 46. In other words, the pivotal joining of the links 42 and 43, will have at that time, just passed center, so that any tendency for the gates 23 to move outwards, will result in pressing the links 42 more firmly against the stop bolts 51, with the result that the gates 23 are securely locked in position and can not be moved from locking position until the pistons 32 are again moved upwards.

It is to be understood that the details of the invention as herein disclosed, are subject to alteration within the spirit or scope of the appended claims.

I claim:

1. A control device for a well casing having a rod-like structure therein, comprising a tubular housing adapted to be interposed in said casing with said rod-like structure extending therethrough, a gate slidable laterally of said housing and having a recess therein to conform with said rod-like structure, and pressure operated means for advancing said gate into the bore of said housing said pressure operated means including means for positively retaining the gate advanced until operated upon by pressure in the reverse direction.

2. A control device for a well casing having a rod-like structure therein, comprising a tubular housing adapted to be interposed in said casing with said rod-like structure extending therethrough, a gate slidable laterally of said housing and having a recess therein to conform with said rod-like structure, and pressure operated means for advancing said gate into the bore of said housing and into sealing engagement with said rod-like structure said pressure operated means including means for positively retaining the gate advanced until operated upon by pressure in the reverse direction.

3. A control device for a well casing having a rod-like structure therein, comprising a tubular housing adapted to be interposed in said casing with said rod-like structure extending therethrough, a gate slidable laterally of said housing and having a recess therein to conform with said rod-like structure, a pair of pivotally joined links, one of said links being pivoted to said gate and the other being pivoted to the housing, means operatively connected to said links to vary the angle between the links and effect sliding of said gate, and means for stopping further movement of the links after the pivotal connection therebetween has passed beyond the plane including the axes of the pivotal connections of the links to the housing and to the gate.

4. A control device for a well casing, comprising a tubular housing adapted to be interposed in said casing and having chambers extending laterally from the bore thereof, a gate slidable within each of said chambers, a pair of pivotally joined links associated with each of said gates, one being pivoted to the gate and the other to the housing, means for varying the angularity between the links of each pair to effect sliding of the associated gate, and means for stopping further movement of the links after the pivotal connection therebetween has passed beyond the plane including the axes of the pivotal connections of the links to the housing and to the gate.

5. A control device for a well casing, comprising a tubular housing adapted to be interposed in said casing and having chambers extending laterally from the bore thereof, a gate slidable within each of said chambers, a pair of pivotally joined links associated with each of said gates, one being pivoted to the gate and the other to the housing, means for simultaneously varying the angularity between the links of each pair to effect sliding of all of said gates, and means for stopping further movement of the links after the pivotal connection therebetween has passed beyond the plane including the axes of the pivotal connections of the links to the housing and to the gate.

6. A control device for a well casing, comprising a tubular housing adapted to be interposed in said casing and having chambers extending laterally from the bore thereof, a gate slidable within each of said chambers, a pair of pivotally joined links associated with each of said gates, one being pivoted to the gate and the other to the housing, a cylinder associated with each of said gates and mounted with its axis in perpendicularity with the plane of movement thereof, a piston reciprocable in each cylinder and operatively connected to the associated links to vary the angle therebetween, means for introducing fluid under pressure to said cylinders, and means for stopping further movement of the links after the pivotal connection therebetween has passed beyond the plane including the axes of the pivotal connections of the links to the housing and to the gate.

7. A control device for a well casing having a rod-like structure therein, comprising a tubular housing adapted to be interposed in said casing with said rod-like structure extending therethrough and having chambers extending laterally from the bore thereof, a gate slidable within each of said chambers, each of said gates having a recess therein to conform with said rod-like structure, a pair of pivotally joined links associated with each of said gates, one being pivoted to the gate and the other to the housing, a cylinder associated with each of said gates and mounted with its axis in perpendicularity with the plane of movement thereof, a piston reciprocable in each cylinder and operatively connected to the associated links to vary the angle therebetween, means for introducing fluid under pressure to said cylinders, and means for stopping further movement of the links after the pivotal connection therebetween has passed beyond the plane including the axes of the pivotal connections of the links to the housing and to the gate.

8. In a well control device, a housing, a gate slidable therein, a pair of pivotally joined links, one pivoted to said gate and the other to the housing, means for varying the angularity between said links to effect sliding of the gate, and a stop carried by said housing and adapted to limit further movement of said links with the gate at its extreme extended position and with the pivoted connection of said links to each other disposed beyond the plane including the pivotal connection of the links to the gate and to the housing.

In testimony whereof I have signed my name to this specification.

LOUIS M. BETTINGER.